PRICE & LEWIS.
Fagot for Railroad Rails.
No. 2,651. Reissued June 18, 1867.
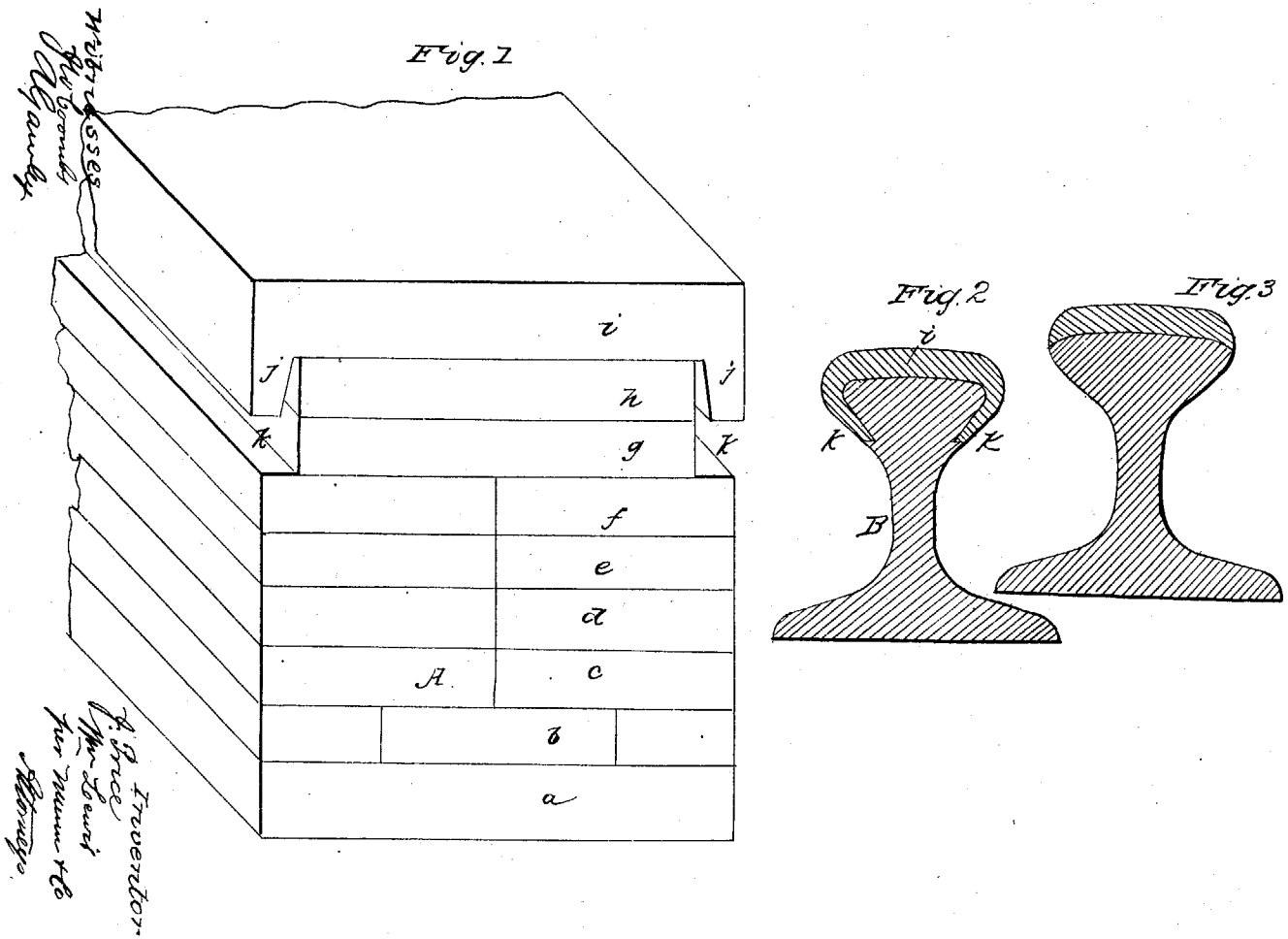
N. PETERS. Photo-Lithographer. Washington, D. C.

United States Patent Office.

JOHN PRICE AND WILLIAM LEWIS, OF DANVILLE, PENNSYLVANIA.

*Letters Patent No.* 36,795, *dated October* 28, 1862; *reissue No.* 2,651, *dated June* 18, 1867.

IMPROVED FAGOT FOR RAILROAD RAILS.

The Schedule referred to in these Letters Patent and making part of the same.

TO ALL WHOM IT MAY CONCERN:

Be it known that we, JOHN PRICE and WILLIAM LEWIS, both of Danville, in the county of Montour, and State of Pennsylvania, have invented a new and improved Form-Piece, Pile, or Fagot for Railroad Rails; and we do hereby declare that the following is a full, clear, and exact description of the same, reference being had to the accompanying drawing, forming a part of this specification, in which—

Figure 1 represents a perspective view of our invention.

Figure 2 is a transverse vertical section of a rail rolled from our pile.

Figure 3 is a similar section of a rail rolled from the ordinary pile.

Similar letters of reference in the three views indicate corresponding parts.

The ordinary pile for rolling T-rails consists of a series of flat bars placed one on the top of the other, the top layer, which is intended to make the outer surface of the head of the rail, being of re-heated iron. The great fault with rails rolled from such piles is their liability to laminate, that is, the outer surface of the head of the rail will almost invariably get loose and curl up at the ends, and in some cases strip off entirely for ten or twelve feet. To obviate this difficulty is the object of our invention, which consists in making the top layer, which forms the outer surface of the head of the rail, with flanges, projecting downward on each side of the layer or layers directly beneath it, leaving a recess between the points of the projecting flanges and the layer below them of near the thickness of a layer, so that when rolled into a rail the flanges of the upper layer will embrace the entire head of the rail, and thus prevent the same from stripping or scaling off.

To enable those skilled in the art to fully understand and use our invention, we will proceed to describe it with reference to the drawing.

The pile A consists of a series of layers, *a b c d e f g h i*, the top layer *i* being provided with flanges *j*, which project down over the edges of the layers *g h*, immediately beneath said top layer, as clearly shown in fig. 1 of the drawing. The layers *g h* are narrower than the layer beneath them, so that between the points of the flanges and the top of the layer *f* a recess, *k*, is left, of nearly the thickness of a layer, and when the pile passes through the rolls the first time, those flanges are pressed down into the recess, thereby encasing two layers. When the rail B from our pile is finished its head is encased by the layer *i*, as clearly shown in fig. 2 of the drawing, and thereby the surface of the head is prevented stripping or scaling off.

The ordinary pile, where the top layer has no flanges, produces a rail such as shown in fig. 3. By observing this figure it will be noticed at once that the surface of the head does not grasp, encase, interlock, or extend into said head, and it is therefore liable to work loose. By means of the flanges *j* and the recess *k* our pile enables us to encase the head of the rail so that it cannot work loose however long it may be in use. Any hard, refractory metal may be used for said caps. Heretofore the difficulty of welding hard crystallized refractory metal has greatly prevented its general adoption for rails, in consequence of its scaling or stripping off, as hereinbefore mentioned. Our invention also enables the sides of the heads of the rails to be made of an additional thickness of superior metal, the part most frequently worn out first on curves where all rails last the least time. The layers beneath the layers *f, g, h,* or *i*, may be composed of old or new, flat or other shaped bars.

We are aware that it has been proposed to form fagots of flat or rectangular bars, with the top bar and the outer bars of the layer beneath it composed of metal different from that of the bars forming the body of the fagot, but such an arrangement involves a double welding of the layers of the fagot at the point where the rails when formed are most liable to strip or peel off, namely, the line of junction of the top bar with the side bars, which liability we regard as most objectionable. We entirely obviate this objection by making the flanges intended to grasp or overlap the sides of the rail form an integral part of the cap or form-piece, or, in other words, make them solid with it, thereby avoiding the necessity of a weld at the point above mentioned. We do not confine ourselves to the exact shape or size of the form-pieces *i*, or the size or shape of the projections thereon, as the same may be varied, or may be of rounded or square form, or standing inward or outward, without deviating from the principle of our invention. For I-rails a similar flanged layer will be placed at the bottom of the pile.

What we claim as our invention is—

A form or formed piece for a fagot to be rolled into a railroad rail, with flanges forming part of the form-piece projecting downward from each side or edge thereof, and over both sides or edges of the layer or layers directly beneath it, said form-piece being intended for the head or tread of the rail, and the layer or layers specified to be the body thereof, substantially as and for the purpose shown and described.

We also claim a railroad rail made from a fagot, constructed substantially as above set forth.

In testimony whereof we have hereunto subscribed our names.

JOHN PRICE,
WM. LEWIS.

Witnesses:

F. W. CONRAD,
ADAM G. LAENGERT, } as to JOHN PRICE.

JOTHAM SMITH,
LYMAN COBB, Jr., } as to WILLIAM LEWIS.